Patented Oct. 16, 1928.

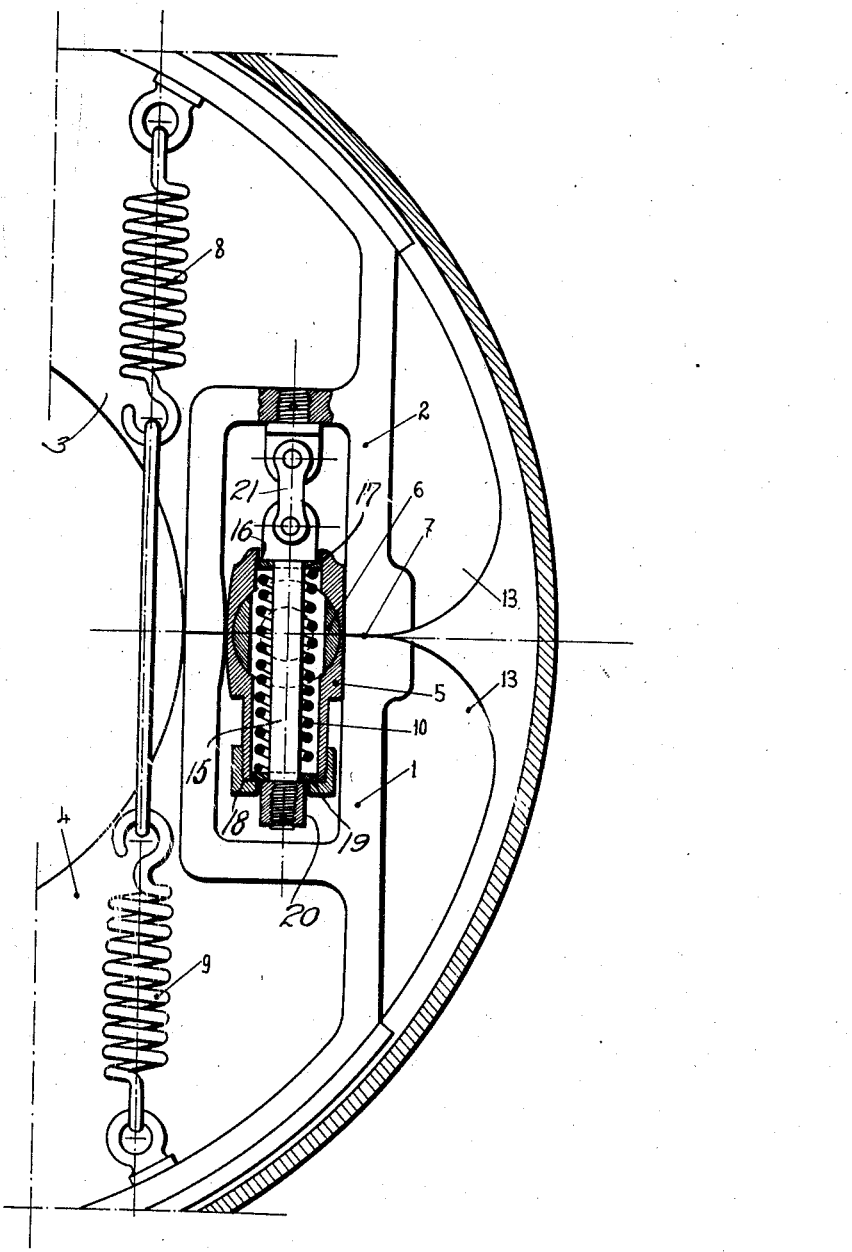

1,687,608

UNITED STATES PATENT OFFICE.

GUIDO FORNACA, OF TURIN, ITALY.

EXPANDING-SHOE BRAKE.

Application filed September 20, 1926, Serial No. 136,593, and in Italy September 28, 1925.

This invention relates to expanding shoe brakes of the kind in which the actual braking effort is created automatically by the rotation of the brake drum in either direction, when the shoes are expanded. Its object is an improved arrangement for supporting and centering the shoes.

In accordance with my present invention a brake of the kind stated has the pivot ends of the two shoes made fork-shaped and supported by a bearing mounted for oscillation on a fixed pivot and through which fork-shaped ends the shoe coming first into contact with the drum in the direction of rotation of the brake drum transmits to the other shoe the thrust it receives from the drum; but both shoes are free to make the movement required to bring them in contact with the drum.

By way of example, a constructional form of the improved brake is illustrated on the accompanying drawing.

1 and 2 denote the fork-shaped ends of the brake shoes 3 and 4, supported by a bearing 5 capable of oscillating on the pivot 6 secured to the fixed shoe-anchor plate. This arrangement allows of a displacement of the shoes as well as their oscillation on the pivot 6.

The shoes transmit the thrust they receive from the drum through the bevelled end surfaces 7 kept in contact by means of the springs 8 and 9.

A spring 10 holds the two shoes centered with respect to the drum in the inactive position shown on the drawing, but allows a sufficient displacement of said shoes in both directions for the operation of the brake. During expansion the shoes turn about the bevelled end surfaces 7.

Reference 13 denotes reinforcing ribs or fins on the forked ends of the shoes.

The spring 10 surrounds a bolt 15 and both bolt and spring pass through an opening in the support or pivot 6. The bearing 5 that oscillates on the pivot pin 6 has at its upper end a shoulder 16 against which lies a washer 17 forming the upper seat for the spring 10. The lower end of the bearing 5 has a perforated cap 18 that forms an abutment for a washer 19 forming the lower seat for spring 10. The bolt 15 passes through both washers 17 and 19 and has a nut 20. The head of the bolt 15 is connected by a shackle 21 in the fork of the upper shoe.

The two shoes 3 and 4 are cammed apart by the usual cam device at their free ends. At their rear or pivoted ends the springs 8 and 9 tend to hold the two shoes together at the pivot 6. When the shoes are cammed apart at their free ends one or the other shoe may engage the brake drum first. Assume that shoe 3 is the first to engage the drum. This shoe is rocked on its cam surface 7 at a point eccentric to and outside of pivot pin 6. Consequently bolt 15 is pulled upward, the nut 20 engaging washer 19 and causing spring 10 to be compressed on the upper washer 17 that is held stationary by the shoulder 16. This causes shoe 3 where it contacts with shoe 4 to exert a pressure on the pivot end of shoe 4 and cause it to engage the drum at its pivot end. This is effected by the cam surfaces 7. When the shoe 3 engages the drum it will be dragged by the latter and push the pivot end of shoe 4 against the drum. Both shoes are free to move apart from the pivot 6 so that the entire surface of each shoe is free to engage the drum. When the brake is released the springs 8 and 9 pull the shoes toward one another and at the same time spring 10 pulls the pivot end of shoe 3 into its centered position with regard to pivot pin 6. The other shoe 4 being caused to assume a similar position as its surface is the meeting line of the two shoes, contacts with the similar surface on the other shoe and under the action of springs 8 and 9.

What I claim is:

1. A vehicle brake having a brake drum, a pair of brake shoes for co-action therewith, and a fixed support for said shoes; in combination with co-acting cam surfaces on the mutual contacting faces of the shoes adjacent the support and forming a shifting pivot for the shoes as they move bodily from the support and means to draw the shoes together when released.

2. A vehicle brake having a brake drum, a pair of brake shoes for co-action therewith and means to draw the shoes together when they are released; in combination with a fixed pivot pin, a bearing on said pin, a bolt passing through the bearing and pin, a spring between the bearing and bolt means to movably connect the bolt to one of the shoes, said shoes having surfaces that abut at the pivot and terminate in co-acting cam surfaces forming a shifting pivot for the shoes as they bodily move from the pivot.

3. A vehicle brake having a brake drum, a pair of brake shoes for co-action therewith, a fixed support for the shoes and springs to retract the shoes when they are released; in combination with a fork formed at the pivot end of each shoe when they abut one another at their open ends, a bearing within the forks and mounted to oscillate on the fixed support, and having a shoulder therein at one end, a bolt passing through said bearing and support, a spring on the bolt abutting said shoulder, a shackle connecting one end of the bolt to one of the shoes and cam surfaces forming extensions of the contacting surfaces of the shoes providing a shifting pivot for the shoes as they move from the support.

In testimony that I claim the foregoing as my invention I have signed my name.

GUIDO FORNACA.